(12) United States Patent
Jin et al.

(10) Patent No.: US 7,801,028 B2
(45) Date of Patent: Sep. 21, 2010

(54) METHOD AND APPARATUS FOR TRANSPARENT AUTO-RECOVERY IN CHAIN AND RING NETWORKS

(75) Inventors: Shaozheng Steven Jin, Acton, MA (US); William LeRette, Tewksbury, MA (US)

(73) Assignee: Schneider Automation Inc., North Andover, MA (US)

( * ) Notice: Subject to any disclaimer, the term of this patent is extended or adjusted under 35 U.S.C. 154(b) by 188 days.

(21) Appl. No.: 11/967,437

(22) Filed: Dec. 31, 2007

(65) Prior Publication Data

US 2009/0168643 A1 Jul. 2, 2009

(51) Int. Cl.
H04L 12/437 (2006.01)
G06F 11/00 (2006.01)

(52) U.S. Cl. ................... 370/222; 370/216; 370/221

(58) Field of Classification Search .......... 370/222, 370/223, 224, 221, 216
See application file for complete search history.

(56) References Cited

U.S. PATENT DOCUMENTS

| | | | |
|---|---|---|---|
| 5,491,690 A | 2/1996 | Alfonsi et al. | |
| 6,122,753 A | 9/2000 | Masuo et al. | |
| 6,400,681 B1 | 6/2002 | Bertin et al. | |
| 6,430,700 B1 * | 8/2002 | Daruwalla et al. | 714/4 |
| 6,545,977 B2 | 4/2003 | Harshavardhana et al. | |
| 6,597,658 B1 * | 7/2003 | Simmons | 370/221 |
| 6,615,362 B1 * | 9/2003 | Daruwalla et al. | 714/4 |
| 6,633,537 B1 * | 10/2003 | Shimizu | 370/216 |
| 6,680,912 B1 * | 1/2004 | Kalman et al. | 370/238 |
| 6,820,210 B1 * | 11/2004 | Daruwalla et al. | 714/4 |
| 6,865,149 B1 * | 3/2005 | Kalman et al. | 370/225 |
| 6,952,396 B1 * | 10/2005 | Cottreau et al. | 370/222 |
| 7,079,483 B2 * | 7/2006 | Yamada et al. | 370/222 |
| 7,200,108 B2 * | 4/2007 | Beer et al. | 370/222 |
| 7,388,828 B2 * | 6/2008 | Nakash | 370/218 |
| 2003/0165119 A1 * | 9/2003 | Hsu et al. | 370/258 |
| 2008/0259920 A1 * | 10/2008 | Cheng et al. | 370/390 |
| 2009/0175166 A1 * | 7/2009 | Long et al. | 370/225 |

FOREIGN PATENT DOCUMENTS

EP 1359715 5/2003

OTHER PUBLICATIONS

International Search Report and Written Opinion, for PCT/US2008/088403, dated Apr. 9, 2009.
Gerstel, et al, Combined WDM and SONET Network Design, Infocom, '99, Eighteenth Annual Joint Conference of the IEEE Computer and Communications Societies, Proceedings, IEEE ,New York, Mar. 21-25, 1999, vol. 2, Mar. 21, 1999.
An Introduction to Resilient Packet Ring Topology, [on-line], Retrieved from the Internet: URL: www.rpralliance.org>, [Retrieved on May 15, 2002].

* cited by examiner

*Primary Examiner*—Chi H Pham
*Assistant Examiner*—Robert Lopata

(57) ABSTRACT

The invention described herein provides a system and method for fault isolation and auto-recovery in chained loop or ring networking systems (103). According to aspects of the method and the associated path-selection algorithms described, fault isolation and auto-recovery operations can be handled locally on each node on a loop and the overall fault recovery time under a link failure condition can be minimized. In addition, the method allows for auto-recovery operations that are transparent to the rest of network and to remote hosts.

23 Claims, 13 Drawing Sheets

METHOD AND APPARATUS FOR TRANSPARENT AUTO-RECOVERY IN CHAIN AND RING NETWORKS

CROSS-REFERENCE TO RELATED APPLICATIONS

None.

FEDERALLY SPONSORED RESEARCH OR DEVELOPMENT

None.

TECHNICAL FIELD

The present invention generally relates to methods for the transparent auto-recovery of a link failure in chain and ring networks. More specifically, the invention relates to the automatic rerouting of data traffic during a failure scenario.

BACKGROUND

Computers systems and network computing operations are increasingly relied upon by individuals, businesses and governments for critical services and business operations. In such systems, network uptime can be critical to the smooth operation of the underlying service or operation, and a network failure must be promptly isolated or restored. Thus, fault isolation and automatic recovery under network failure conditions are crucial requirements for higher bandwidth networks and task-critical networks. In addition, in a typical network failure and recovery scenario, delay on the order of even a few hundred milliseconds can be critical.

Another problem that can be encountered during a network failure scenario is the inability to access the physical links or devices at the location of the failure. For example, in manufacturing or other automation systems, architectures may be decentralized or distributed while delivering performance comparable to centralized systems. For instance, the ADVANTYS STB distributed Input/Output (I/O) system is an open, modular input/output system that makes it possible to design islands of automation managed by a master controller via a bus or communication network. The ADVANTYS STB distributed I/O system is a product of Schneider Automation Inc., One High Street, North Andover, Mass.

Often, the island and associated I/O modules may be widely dispersed and may be in isolated locations, or the target systems may be enclosed in other machinery. In these types of network operations, getting physical access to a remote I/O module or network link during a failure situation can be difficult. Furthermore, in networks such as industrial automation systems, reliability is critical. In a factory, for instance, if a network connection goes down, operators could be physically harmed. In these types of network operations, fault recovery must be automatic.

In a typical fault recovery scenario, when a failure occurs data traffic is rerouted or switched from a current faulty path to a backup path. Depending on the actual redundancy strategy, the standby or backup data path may be dedicated, may require a physical change in connections, or may be a virtual backup path to the active or primary path. Current software methods for providing redundancy in a network require that the devices on the network analyze or discover the entire network to determine a backup path. Rapid Spanning Tree Protocol (RSTP) and Hirschmann™ HIPER-Ring™ are two such methods. In both RSTP and Hirschmann™ HIPER-Ring™, the entire network must be discovered before rerouting can be implemented, adding both time and the use of computing resources to fault recovery. In addition, in both RSTP and Hirschmann™ HIPER-Ring™, the network devices implementing the fault recovery must communicate with other network devices on the network.

Thus, there is a need for a method of fault recovery that is instantaneous, automatically implemented by the network devices, and is transparent to other nodes on a network.

SUMMARY OF THE INVENTION

Aspects of the present invention provide an efficient and fast method of automatic fault recovery in a network based on a ring topology. Upon failure of a link in the network, data traffic is automatically rerouted without the need for system or network reconfiguration. In addition, auto-recovery operations are performed at each node on a ring without message exchange between nodes and communication with remote clients.

According to embodiments of the present invention, each data packet sent from a remote host to a node on a ring network is simultaneously multicast to the ring network from two ports on an edge switch. Thus, under normal operating conditions, the receiving node receives two copies of the data packet from opposite directions on the ring network.

According to aspects of the invention, the first copy of the data packet is processed by the node and the second copy of the data packet is discarded. However, under link or device failure conditions, the normal data flow may be disrupted. Under failure conditions, the present invention assumes that at least one copy of the data packet will be received by the receiving node.

In addition, according to aspects of the present invention, auto-recovery actions under failure conditions are handled promptly on each local node and therefore, the overall processing time can be optimized. Consequently, all the auto-recovery related operations are transparent to the remote host.

BRIEF DESCRIPTION OF THE DRAWINGS

The present invention is illustrated by way of example in the following figures and is not limited by the accompanying figures in which.

DETAILED DESCRIPTION OF THE INVENTION

Figure 1:
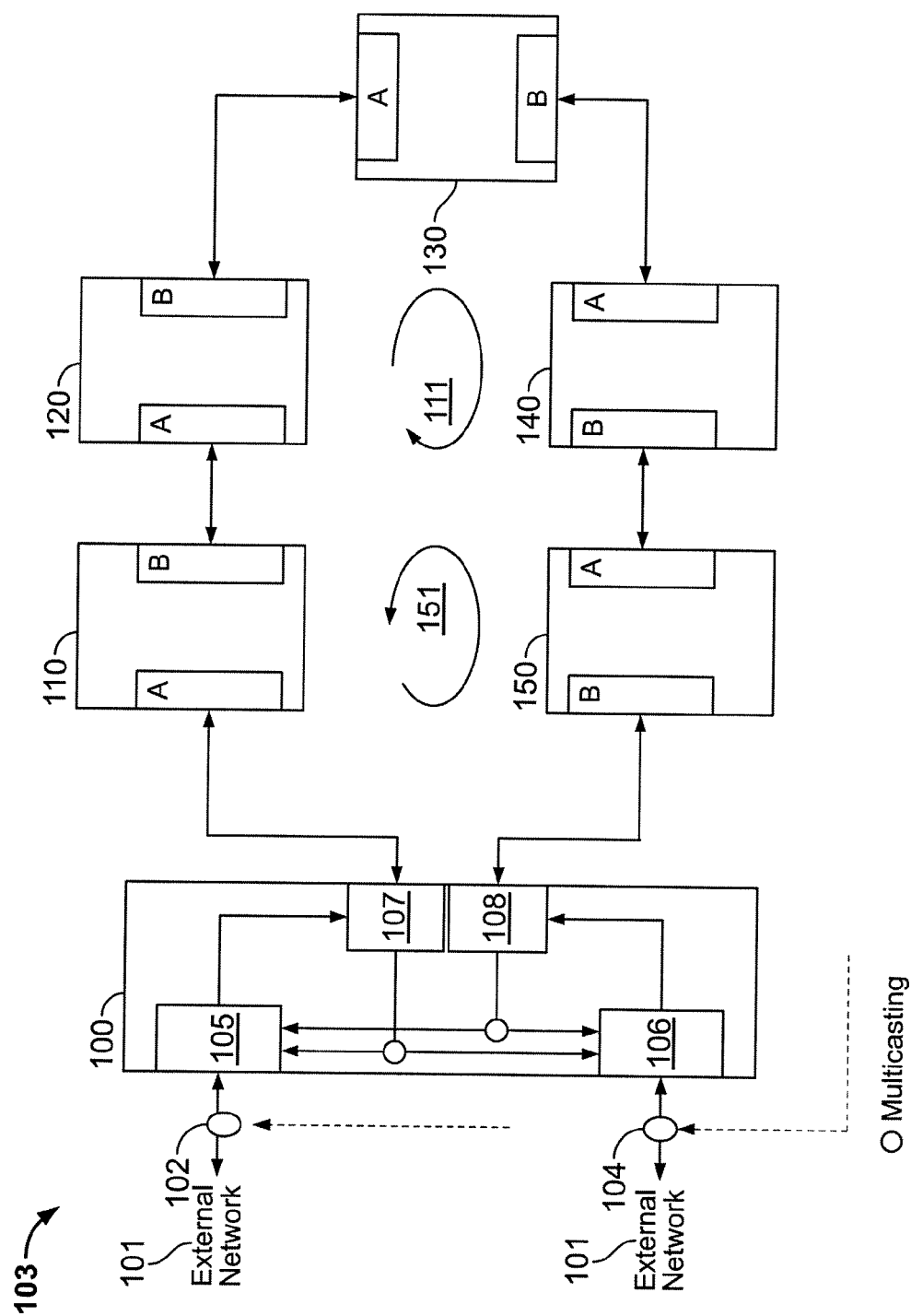
FIG. 1 depicts an exemplary ring network on which an embodiment of the present invention may be performed.

Aspects of the present invention provide an auto-recovery mechanism for use on daisy chain loop or other ring networking systems. FIG. 1 depicts an exemplary ring network 103 on which an embodiment of the present invention may be performed. The exemplary network includes an edge switch 100 with redundant links 102 and 104, and exemplary network nodes 110, 120, 130, 140 and 150. Network 103 may be implemented using a variety of data link layer protocols, such as Ethernet. Each network node contains two ports, A and B, and both ports A and B can be used for ingress and egress traffic. Thus, the exemplary network depicted in FIG. 1 already provides facility level redundancies because two redundant data paths (151 and 111) exist on the loop or ring 103. In addition to the redundant data paths, edge switch 100 may be provisioned with two redundant data links 102 and 104 on which traffic can be multicast out ports 107 and 108 on the redundant data paths 151 and 111. Those skilled in the art of network provisioning will recognize and be able to provision these types of facility redundancies.

According to FIG. 1, node 110 serves as the entry port to the network loop 103 along path 111 and also acts as the exit port for the loop 103 along path 151. Symmetrically, node 150 serves as the entry port for the network loop 103 along path 151 and also as the exit port for the network loop 103 along path 111. In addition, the nodes 110 and 150 are both directly connected to the edge switch 100 which establishes a closed loop. Nodes 120, 130 and 140 on the middle of the loop 103 are each connected to two neighbor nodes. The Ethernet edge switch 100 serves as both the entry point (ingress) and the exit points (egress) to external network 101 (served by links 102 and 104).

According to another embodiment of the invention, one port on edge switch node 100 (either 105 or 106 of FIG. 1) may be disabled. In such a scenario, data received from links (102 or 104) may be multicast to ports 107 and 108. This scenario is discussed further with respect to FIG. 4B.

A general purpose switch device, such as an Ethernet switch, may be used to support embodiments of the invention described herein. The switch may provide non-blocking packet forwarding from any one of the four ports to another other port. In addition, the edge switch should be able to support both packet broadcasting and packet multicasting from any port to any port, as described herein.

Figure 2:
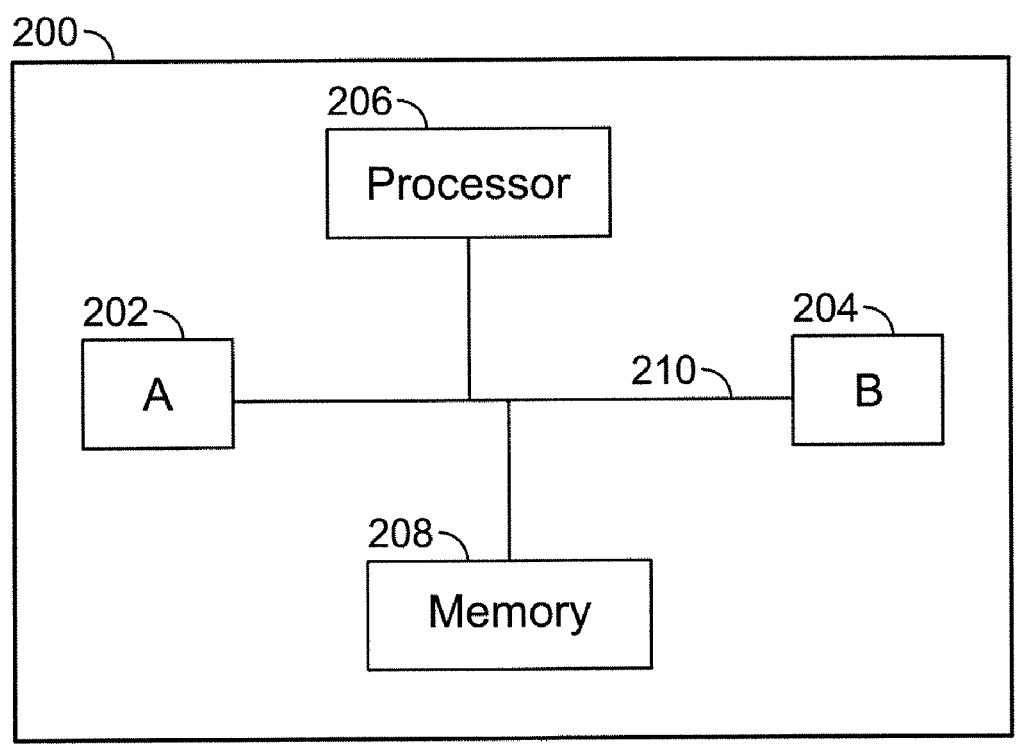
FIG. 2 depicts an exemplary network node suitable for implementing the auto-recovery techniques described herein.

Aspects of the invention may be implemented with a variety of conventional networked computers systems such as the network node 200 shown in FIG. 2. Node 200 includes network interface ports 202 and 204 for receiving ingress and sending egress data traffic, a central processor 206, a system memory 208, and a system bus 210 that couples various system components including ports 202 and 204, central processor 206 and the system memory 208. System bus 210 may be any of several types of bus structures including a memory bus or memory controller, a peripheral bus, and a local bus using any of a variety of bus architectures. The structure of system memory 208 is well known to those skilled in the art and may include a basic input/output system (BIOS) stored in a read only memory (ROM) and one or more program modules such as operating systems, application programs and program data stored in random access memory (RAM). Interfaces 202 and 204 may be any type of network interface well known to those skilled in the art. Furthermore, computer 200 may include drives for interfacing with other types of computer readable media.

The operation of node 200 can be controlled by a variety of different program modules. Examples of program modules are routines, programs, objects, components, data structures, etc., that perform particular tasks or implement particular abstract data types. The present invention may also be practiced in a distributed computing environment where tasks are performed by remote processing devices that are linked through the communications network such as the exemplary network of FIG. 1. In a distributed computing environment, program modules may be located in both local and remote memory storage devices.

Figure 3A:
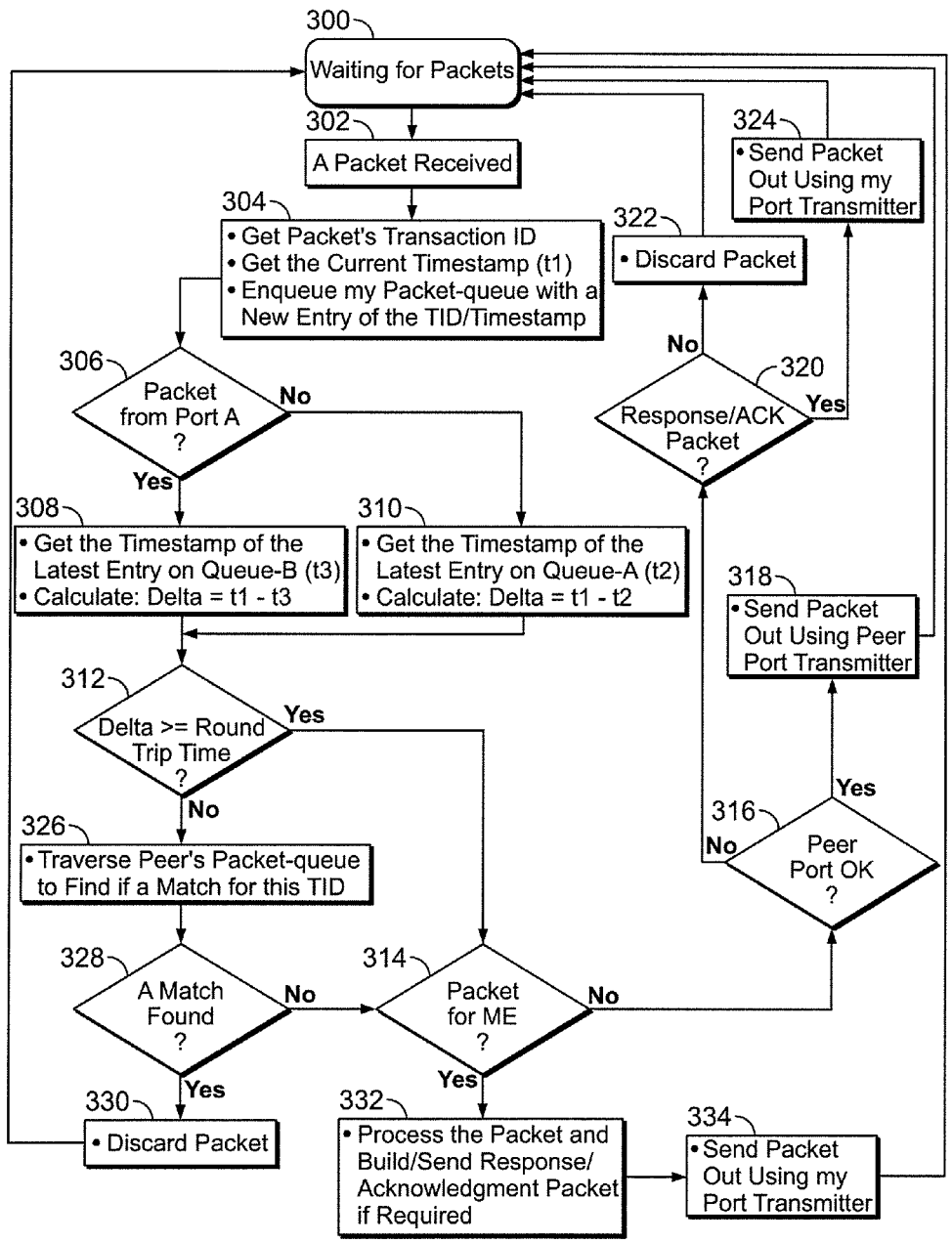
FIG. 3A is a flowchart depicting one embodiment of the data flow and auto-recovery technique according to the present invention.
Figure 3B:
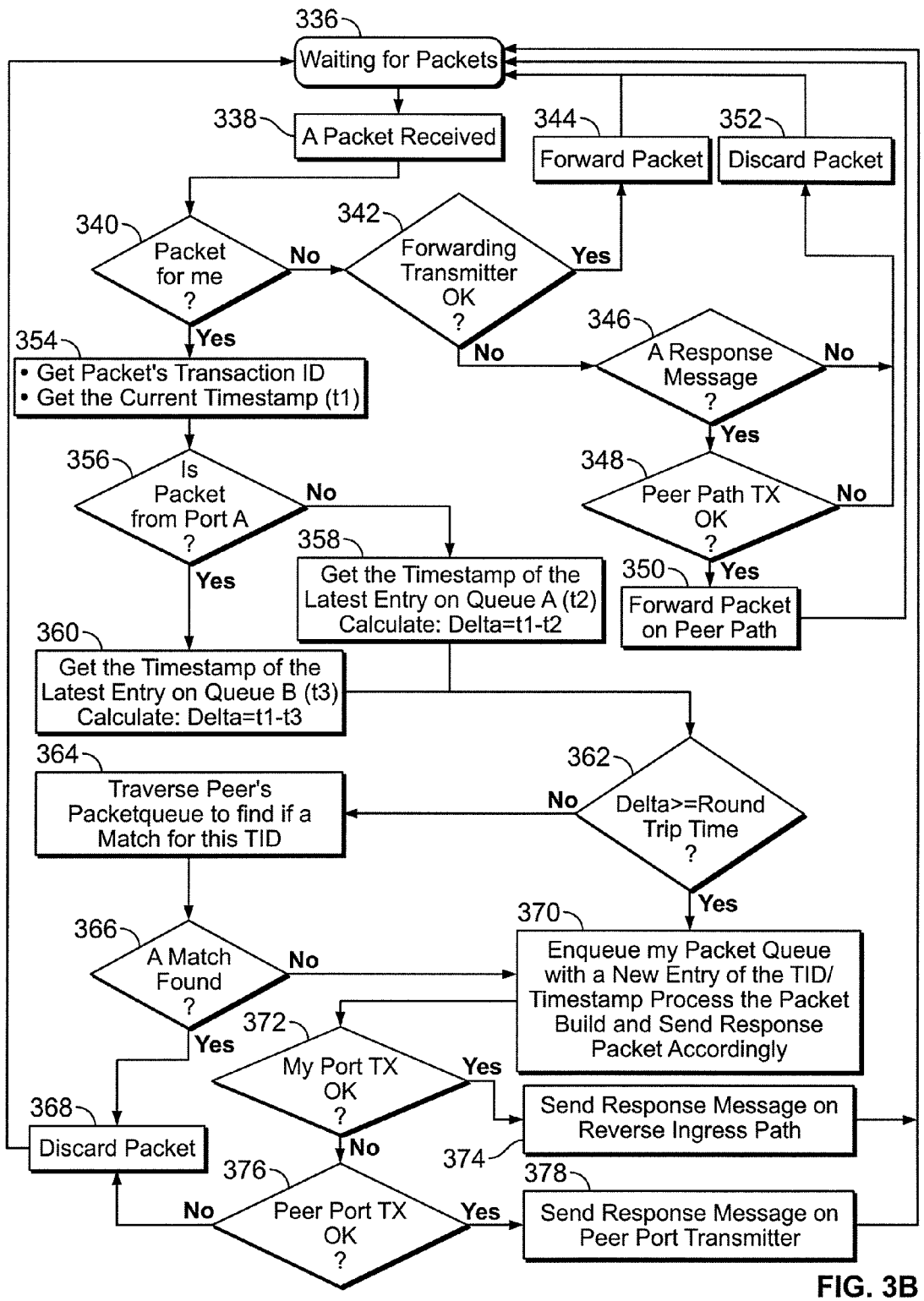
FIG. 3B is a flowchart depicting another embodiment of the data flow and auto-recovery technique according to the present invention.

FIGS. 3A and 3B are flowcharts depicting embodiments of the data flow and algorithms of the auto-recovery technique according to the present invention. FIG. 3A depicts the generic data flow and algorithms in a network that processes unicast, broadcast and multicast data traffic. FIG. 3B depicts a specific data flow in a network that is only concerned about receiving and processing unicast data traffic. FIGS. 3A and 3B will be discussed below with respect to FIGS. 4A-4B and FIGS. 5A-5G.

Figure 4A:
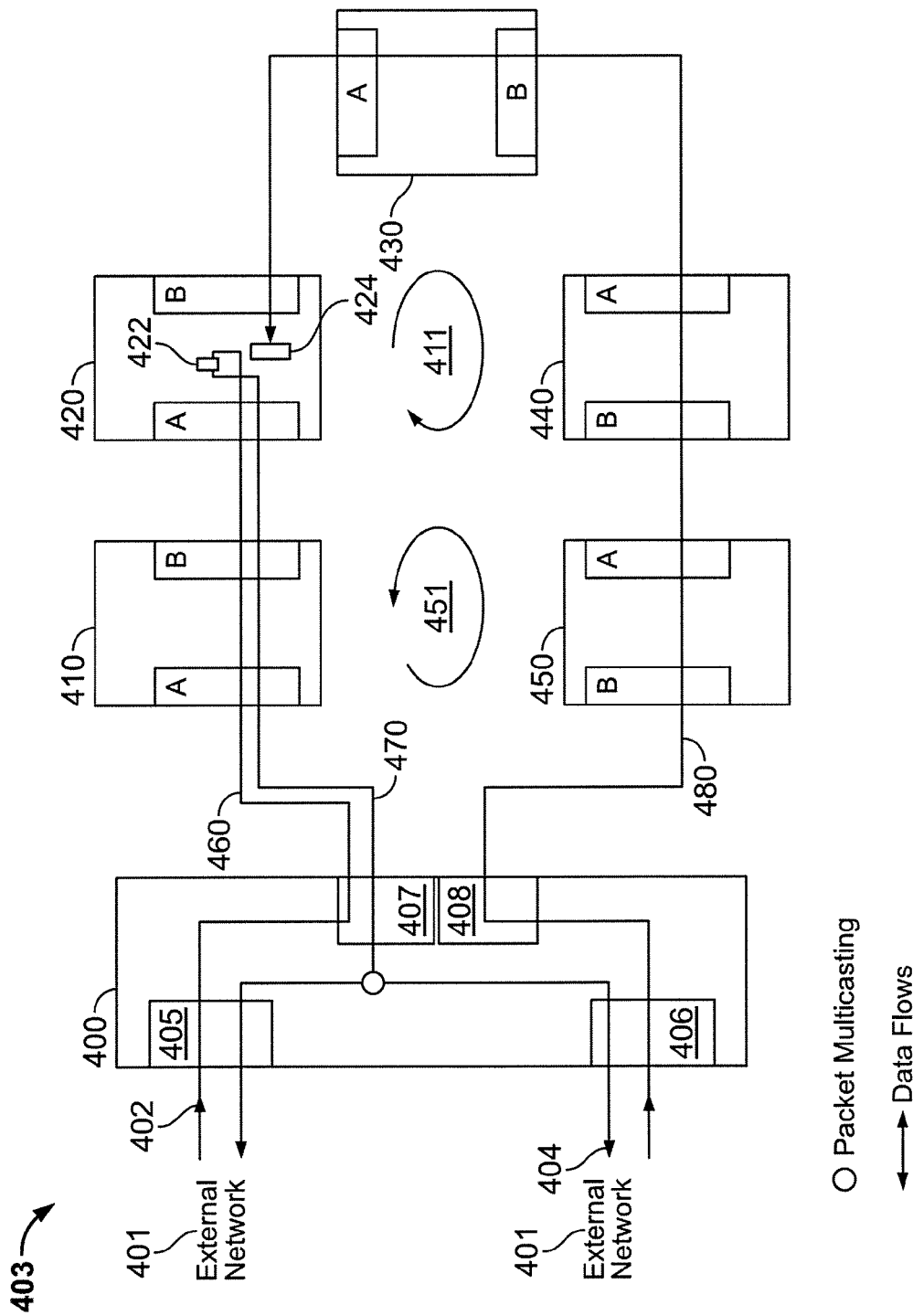
FIGS. 4A and 4B depict data flows on two exemplary ring networks according to an embodiment of the present invention.
Figure 4B:
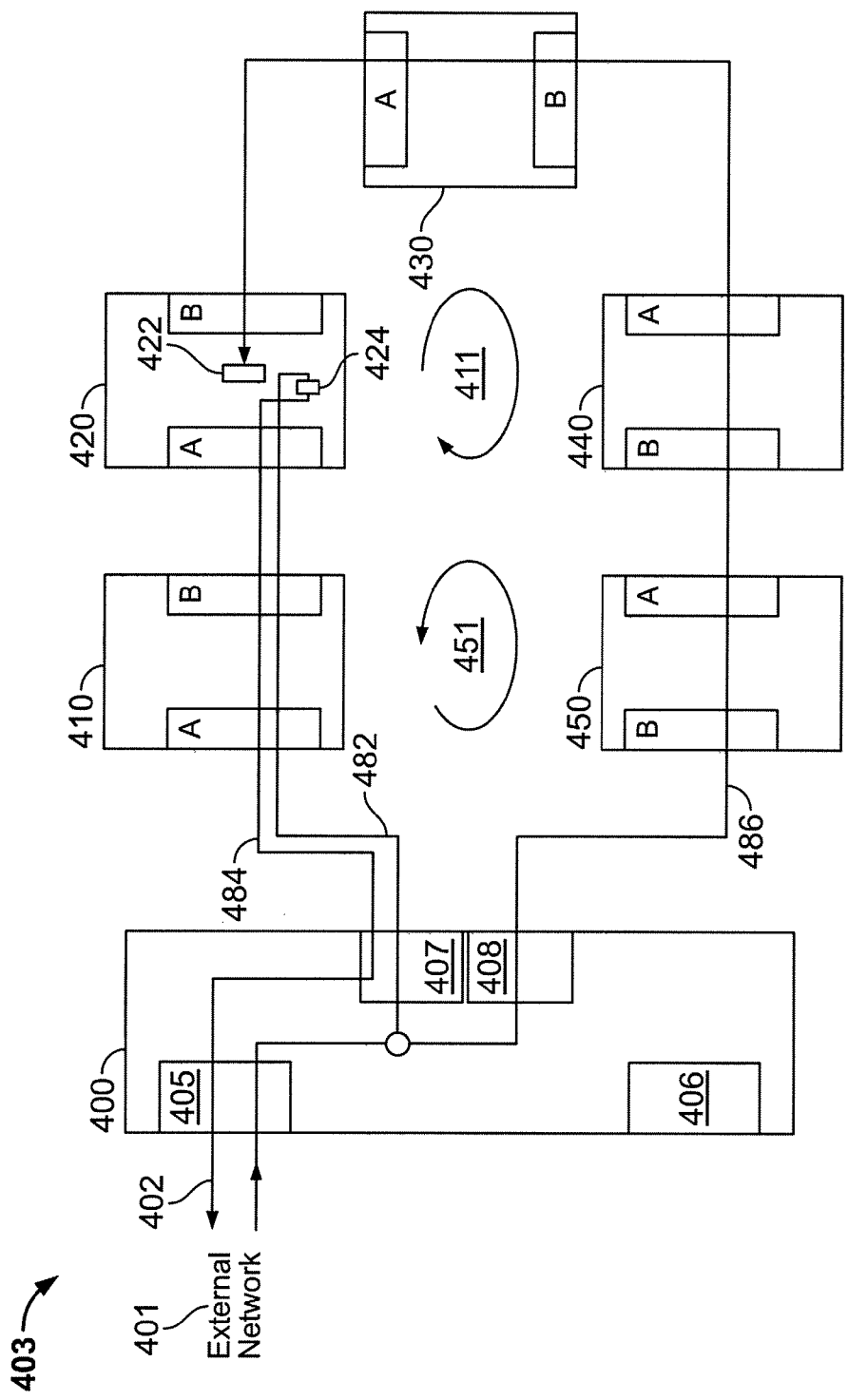

FIGS. 4A and 4B depict data flows on two exemplary ring networks according to an embodiment of the invention. In the network of FIG. 4A, Ethernet edge switch 400 has four ports configured (405, 406, 407, and 408) and FIG. 4B depicts a network wherein the Ethernet edge switch 400 has three ports configured (405, 407 and 408). The network of FIG. 4A includes further redundancy in that ports 405 and 406 support redundant links 402 and 404 to an external network 401. In contrast, the network of FIG. 4B only supports one link 402 to an external network 401 on port 405.

In FIG. 4A, two ports 405 and 406 are configured on edge switch 400, and are dedicated for connections to an external network 401 over redundant links 402 and 404. Ports 407 and 408 may be dedicated for the connections between the edge switch and the two head nodes 410 and 450. In the ingress direction, switch 400 may provide the internal packet forwarding from port 405 to port 407 and from port 406 to port 408. Traffic flows 460 and 480 depict ingress traffic. In the egress direction, edge switch may multi-cast egress traffic 470 from port 407 to ports 405 and 406. Symmetrically, egress traffic arriving on port 408 may be multicast to both port 405 and port 406.

As seen in FIG. 4A, any packet which is from a remote host to a node on the internal loop network 403 may be received on its port 405 and its port 406. If only one link is configured, either port 405 or port 406 as seen in FIG. 4B, the packet will not be protected if the one link fails. However, if both links are configured, the packet will be protected and can survive a failure on one link.

In FIG. 4B, only one port 405 is configured on edge switch 400 and is dedicated for a connection to an external network 401 over link 402. In the ingress direction, switch 400 may provide the internal packet forwarding/multi-casting from port 405 to ports 407 and 408. Traffic flows 482 and 486 depict ingress traffic. In the egress direction, edge switch 400 may forward egress traffic 484 from port 407 to port 405.

According to embodiments of the invention described herein, ports 407 and 408 of the edge switch 400 must be enabled regardless of whether one (FIG. 4A) or two (FIG. 4B) external links are provisioned. If both external links are provisioned, then the two ingress ports, port 405 and 406 will both be enabled. If only one link is provisioned, then only the port which connects to the link will be enabled. If both ports are enabled, any packet received on port 405 will be forwarded to port 407 (point to point); any packet received on port 406 will be forwarded to port 408 (point to point). If only one port is enabled, any packet received on that port will be multicast to both port 407 and port 408. These control logics may be predefined and enforced in the system configuration of the edge switch 400, or may be dynamically defined in the normal operational mode of the edge switch.

In addition, each node 410, 420, 430, 440 and 450 on the chain, contain at least two full-duplex ports A and B. One port is used to connect each node to its upstream node or the edge switch 400 and the other port is used to connect each node to its downstream node or the edge switch 400. Within the loop network 403 as shown in FIGS. 4A and 4B, port A of node 410 may have a direct connection with port 407 of edge switch 400 and port B of node 410 may be directly connected to port A of its downstream node 420 along path 411. This chain connection continues all the way to node 450, where port B of node 450 may be directly connected to port 408 on edge switch 400 to close the connection loop. The reverse is true for path 451.

Accordingly, as shown in FIGS. 4A and 4B, two sets of redundancies are provided in the network loop 403. First, a pair of redundant links 402 and 404 may be provided by a remote host via an external network 401 to connect to the loop 403 via the edge switch 400. This redundancy may be used for auto-recovery when either link 402 or 404 is broken, as further described below. As discussed above, this redundancy is supported in one embodiment described. In addition, two redundant full-duplex data paths 451 and 411 may be provided within the network loop 403 created by the nodes 410, 420, 430, 440, and 450. This redundancy may be used for auto-recovery when failure(s) occurs within the network loop 403, as further described below.

FIG. 4A further depicts data flow under normal operating conditions with a 4-port configured edge switch 400. Traffic received on port 405 may be forwarded to port 407, and further delivered onto path 411 of the loop 403 where the traffic 460 enters the loop 403 of network nodes. Similarly, traffic received on port 406 may be forwarded to port 408 and then the same traffic 480 is delivered onto 451 on the loop 403. In FIG. 4A, a data packet is delivered to node 420, wherein the destination address of the data packet is the network address of node 420. For example, the destination address of the data packet may be the IP address of node 420. Each node further contains a packet processing routine 422 and a packet squelching routine 424. FIG. 4B similarly depicts data flow under normal operating conditions with a 3-port configured edge switch.

Referring to FIG. 4A, and under normal operating conditions, each data packet flowing on the network loop 403 moves along two separate paths, paths 451 and 411. Thus, each node on the loop 403 receives two copies of the same data packet. According to aspects of the present invention, the first copy of the packet will be handled by routine 422, and the second copy will be discarded by routine 424 (See FIGS. 3A and 3B). According to the embodiment of FIG. 4A, on edge switch 400, data packets received on either ports 407 or 408 (traffic flow 470) in the egress direction will be multicast to both ports 405 and 406.

Any packet sent from a remote host to a node on the internal loop network 403 enters the loop network 403 via the edge switch 400 and may be delivered from either port 407 or port 408. If the packet is received by any one of nodes 410, 420, 430, 440 or 450 along path 411, the receiving port will be its port A. If the packet is received along 451, the receiving port will be its port B.

Referring to both FIGS. 4A and 4B, any response message packet which is sent from a node on the internal network loop 403 to a remote host on the external network 401 may be received on ports 407 or 408, but not on both. If only one external link is configured (refer to FIG. 4B), the packet will be forwarded to the configured external link 405 or 406 where the response message will be delivered to the remote host via the external network 401. If both links are configured, the packet will be multicast to both ports 405 and 406 where the packet will be delivered to the remote host on both external links via the external network 401.

Any response packet which is sent from a node on the internal loop network 403 to a remote host may be sent via the edge switch 400. From the internal node (node 420 in FIG. 4A), the packet may be created and sent out on its port A or port B, but not on both ports. If the response packet is sent on port A, the packet will be sent to port 407 on the edge switch 400 through path 451. If the packet is sent on port B, the packet will be sent to port 408 on edge switch 400 through path 411.

The Transparent Auto-Recovery Method and Algorithms

Referring back to the embodiment described in FIG. 3A, when a node receives a data packet at step 302, the node starts processing the packet (steps 304-314 and step 328). After the packet is processed, the node either decides to handle the packet by sending a response or acknowledgement packet along the same path but in the opposite direction at steps 332 and 334 or forwards the packet to its downstream node at step 318 if the packet has never been received on this node. Or, the node will discard the packet at step 328 and step 330 if the same packet has been received before. Referring back to the embodiment described in FIG. 3B, when a node receives a data packet that is not addressed to the node at step 340, the node forwards the same packet to its downstream node along the same path (step 344) without any further processing of the data packet. When a node receives a data packet that is addressed to the node (e.g., node 420 in FIGS. 4A and 4B) at step 340, the node processes the packet (steps 354-370). After the packet is processed, the node then sends a response or acknowledgement packet along the same path but in the opposite direction at step 374. Both of the embodiments shown in FIGS. 3A and 3B will be described further below.

According to the embodiment of FIG. 3A, at step 300 a node waits for packets. At step 302, a node (for example, node 420 in FIG. 4A) receives a packet on one of its ports (for example, port A of node 420 in FIG. 4A). For each valid packet received on port A or port B of the node, the node may locally save the packet's transaction information and a timestamp of when the packet is received in a data structure for the port at step 304. This information may then be used at steps 308-312. Those skilled in the art can identify an appropriate data structure for use with embodiments of the present invention. An appropriate data structure may have the following characteristics: a new entry can be inserted into the structure easily; traversing the whole list of entries, or the first and last entries, in the structure is easy and fast; when the list is full, the last entry of the structure can be removed to make room for a new entry to be inserted into the list; the structure will have a fixed number of entries.

In addition, a data structure queue according to aspects of the invention should have enough space to accommodate all received and valid packets in a time window corresponding to the time for a packet traveling along the whole loop network from entry-point to the exit point, as seen during processing steps 308-312. This window includes the time the packet spends on each link between nodes on a loop plus the internal node time for forwarding the packet from port A to port B on each node internally. Therefore, the actual needed queue size is really dependent on the size of the loop.

Thus, at step 304 of FIG. 3A, the node retrieves the transaction information and a timestamp of a received packet that is addressed to the node. The transaction information may be any form of information or identifier that is included in the header or payload of the packet which is used to identify the packet. At step 306, it is determined which port on the node received the packed. If the packet was received on port A of the node, the node retrieves the timestamp of the latest packet received on port B, and subtracts this time stamp from the timestamp of the current packet being processed to arrive at a delta time (step 308). If the packet is received on port B of the node, the node retrieves the timestamp of the latest packet received on port A, and subtracts this time stamp from the timestamp of the current packet being processed to arrive at a delta time (step 310). Next, at step 312, the node compares the delta time to a round trip time for the given system. For any given system, the round trip time is the longest time it takes for a packet traveling around the loop, e.g. from port 405 on node 400 (refer to FIG. 4A) to node node 410, then node 420, all the way to port 406 of node 400. If the delta time calculated by the node is greater than or equal to the round trip time for the loop network, the node does not need to traverse the peer port's data structure to find a match because the node would not have already received the packet. More preciously, it will be the first copy of the packet to be received by the node, which the node will handle, rather than discard. Thus, at step 314, the node simply determines if the packet is addressed for the node. For example, if node 420 determines that the packet is addressed for node 420, at step 332 the node then processes the payload of the packet, and builds a response packet to send to the remote host. At step 334 the node transmits the response packet. If at step 314, the node determines that the packet is not addressed to the node, the node determines if the transmitter of its peer port is operational (step 316), and if it is, the packet will be forwarded out on this port (in the example, port B of node 420 in FIG. 4A), where the packet will be delivered to its downstream node (node 430 in FIG. 4A) along the same path, i.e. path 411 in FIG. 4A, in the same direction. Conversely, if a packet is received on port B, that packet will be forwarded to port A where the packet will be delivered to its downstream node along the same path, i.e. path 451, in the same direction. If the forwarding transmitter (on the peer port) is not operational at step 316, the node first determines if the packet is a response packet at step 320. If the packet is a response packet, the packet is discarded at step 322. If the packet is not a response packet, the packet will be forwarded using the transmitter on the same port but in the opposite direction it was received at step 324. Thus, the packet will be delivered to its upstream node, node 410 (refer to FIG. 4A or FIG. 4B).

Going back to step 312, if the node determines that the delta time calculated by the node is not greater than or equal to the round trip time for the loop, at step 326 the node traverses the peer port's data structure (i.e., the transaction information and timestamps for packets received) to determine if the packet has already been received on the peer port, i.e., if a match is found, at step 328. If a match is found, the node discards the packet at step 330. If a match is not found, the node continues with step 314 to determine if the packet is addressed for the node as described in the above.

As noted above, FIG. 3B is a flowchart of the data flow and algorithms of the auto-recovery technique according to a second embodiment of the present invention in which only unicast traffic is at stake.

According to the embodiment of FIG. 3B, at step 336 a node waits for packets. At step 338, a node (following the example from above, node 420 in FIG. 4A) receives a packet on one of its ports (port A, for example). At step 340, the node determines if the packet is addressed to it. If the packet is not addressed to the node, the node determines if its forwarding transmitter is operational (step 342), and if it is, the packet will be forwarded out the opposite port (in the example, port B), where the packet will be delivered to its downstream node (node 430 in FIG. 4A) along the same path (path 411 if the received port is port A or path 451 if received on port B) in the same direction. If the forwarding transmitter is not operational at step 342, the node first determines if the packet is a response packet at step 346. If the packet is a response packet, the packet is discarded at step 352. If the packet is not a response packet, the node determines if the peer path transmitter is operational at step 348, and if it is, the packet will be forwarded on the peer path transmitter at step 350.

Still referring to FIG. 3B, if a received packet is addressed to the node (e.g., port A on node 420 in FIG. 4A), the node will handle the packet (steps 354-370). If an identical packet has not already been received on the node's peer port, a response message will be created and then sent on its own transmitter where the packet will be delivered along the path 451, at steps 372 and 374. If the response packet can not be delivered via the transmitter on the same port, the response packet will be sent to the transmitter on its peer port where the packet will be delivered along path 411 at steps 376 and 378.

As shown in FIG. 3B, packets received and accepted on each of the two ports (port A and port B) of any node on the network loop are recorded at step 354. For each valid packet received on port A or port B of the node, the node may locally save the packet's transaction information and a timestamp of when the packet is received in a data structure for the port. The information may then be used at steps 358-362. As discussed above, those skilled in the art can identify an appropriate data structure for use with embodiments of the present invention.

At step 354 of FIG. 3B, the node retrieves the transaction information and a timestamp of a received packet that is addressed to the node. The transaction information may be any form of information or identifier that is included in the header or payload of the packet which is used to identify the packet. At step 358, if the packet received on port B of the node, the node retrieves the timestamp of the last packet received on port A, and subtracts this time stamp from the timestamp of the current packet being processed to arrive at a delta time. If the packet is received on port A of the node, the node retrieves the timestamp of the last packet received on port B, and subtracts this time stamp from the timestamp of the current packet being processed to arrive at a delta time (step 360). Next, the node compares the delta time to a round trip time for the given system. For any given system, the round trip time is the longest time it takes for a packet traveling around the loop, e.g. from port 405 to port 406. At step 362, if the delta time calculated by the node is greater than or equal to the round trip time for the loop network, the node does not need to traverse the peer port's data structure because the packet would not have had time to travel the opposite direction around the loop to reach the peer port. Thus, the transaction information and timestamp is saved in the appropriate port's data structure, the node processes the payload of the packet, and the node builds and send a response packet to the remote host (step 370). However, if the delta time calculated by the node is not greater than or equal to the round trip time for the loop network, at step 364 the node traverses the peer port's data structure (i.e., the transaction information and timestamps for packets received) to determine if the packet has already been received on the peer port. If a match is found, the node discards the packet at step 368. If a match is not found, the node processes the packet as described at step 370.

Data Flows with Auto-Recovery Under Failure Conditions

Figure 5A:
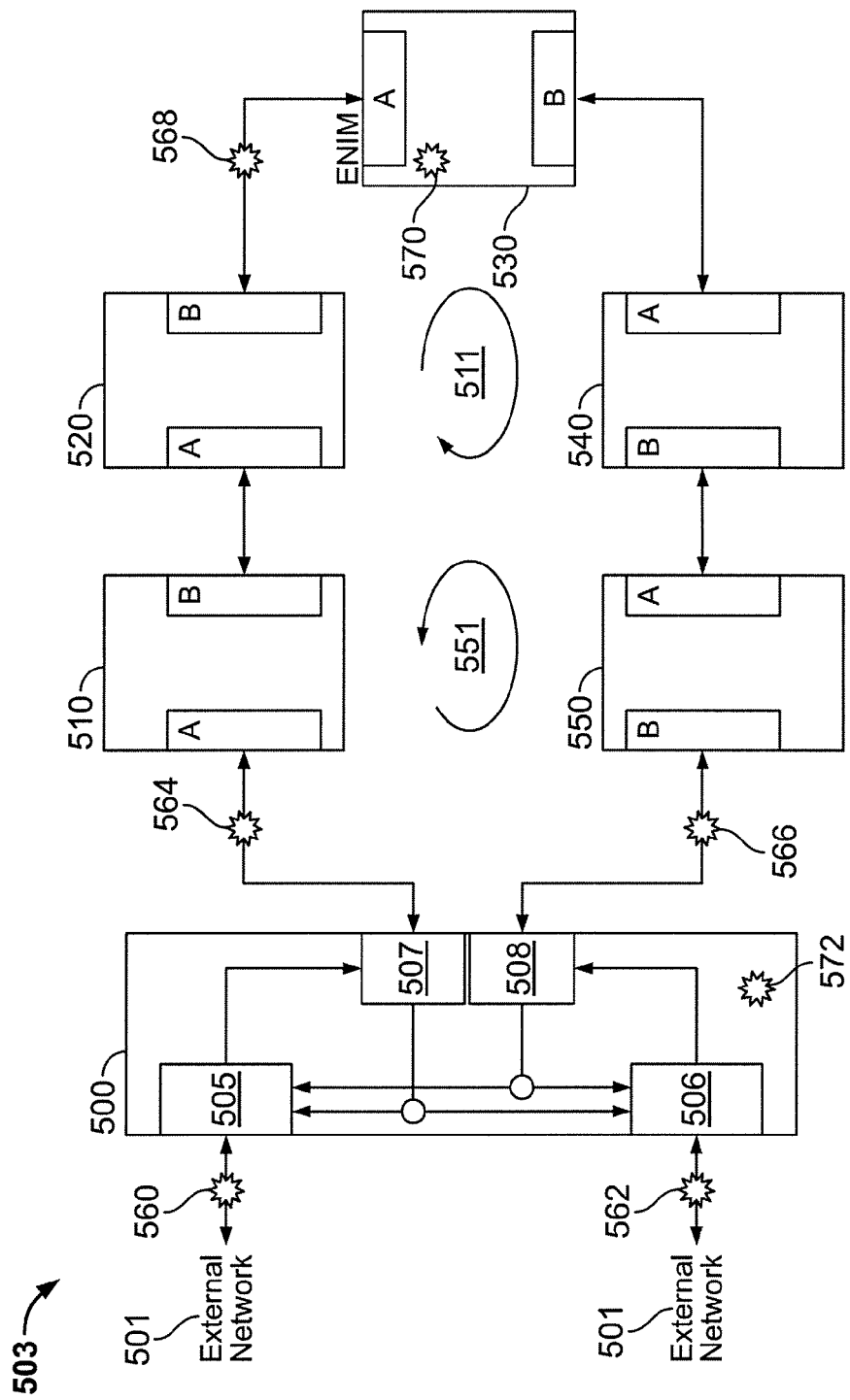
FIG. 5A depicts exemplary failure locations on an exemplary ring network according to an embodiment of the present invention.

FIG. 5A depicts failure conditions that may occur in the embodiments described herein, and FIGS. 5B-5G depict data flow according to the auto-recovery techniques described herein. As seen in FIG. 5A, failure conditions 560 and 562 may occur during a link-down condition on an external network 501. Failure condition 564 in FIG. 5A may occur during a link-down condition on the link between port 507 of edge switch 500 and port A of node 510. Failure condition 566 in FIG. 5A may occur during a link-down condition on the link between port 508 of edge switch 500 and port B of node 550. Failure condition 568 in FIG. 5A may occur during a link-down defect condition detected on port B of node 520 and port A of node 530, in the middle of the network loop 503. Failure condition 570 in FIG. 5A may occur during a node 530 device failure or removal and would create a link-down defect condition detected on port A of node 540 and port B of node 520 in the middle of the network loop 503. Failure condition 572 in FIG. 5A may occur during the failure of the edge switch 500. During failure condition 572, the auto-recovery techniques described herein would not resolve data flow between the external network links and the network loop 503.

With the data flow and algorithm techniques described above in FIGS. 3A and 3B, according to aspects of the present invention, certain data flows will be ensured under the exemplary failure conditions 560, 562, 564, 566, 568, 570, and 572, described above in reference to FIG. 5A.

Data flow control on the edge switch 500 and data flow control on each node of the network loop 503 are significantly different. The control for data flows in the edge switch may be predefined and no dynamic control logic or algorithms are needed. The static data flow control in the edge switch 500, therefore, may be enforced in a system configuration phase, before the system is brought up to the operational mode.

Referring to FIG. 5A, failure conditions between the edge switch 500 and each of the two head nodes 510 and 550 in the loop network 503 will cause similar automatic recovery behaviors. A failure between the edge switch and node 510 will break the entire path 511 within the loop 503 while port 507 will stop receiving response message packets from the egress direction on this path; the failure between the edge switch 500 and node 550 will break the whole path 551 within the loop 503 while port 508 will stop receiving response message packets from the egress direction on this path. These failures only affect one data path but not both. Any single failure condition on the middle of the loop network 503 (e.g., 568 and 570) will affect both data paths (551 and 511) simultaneously. However, when a failure condition 568 or 570 occurs, paths 551 and 511 will not both be completely blocked. Instead, only part of the two paths will be affected. The data flows for each described failure condition 560, 562, 564, 566, 568, 570, and 572 according to aspects of the invention are described below.

Figure 5B:
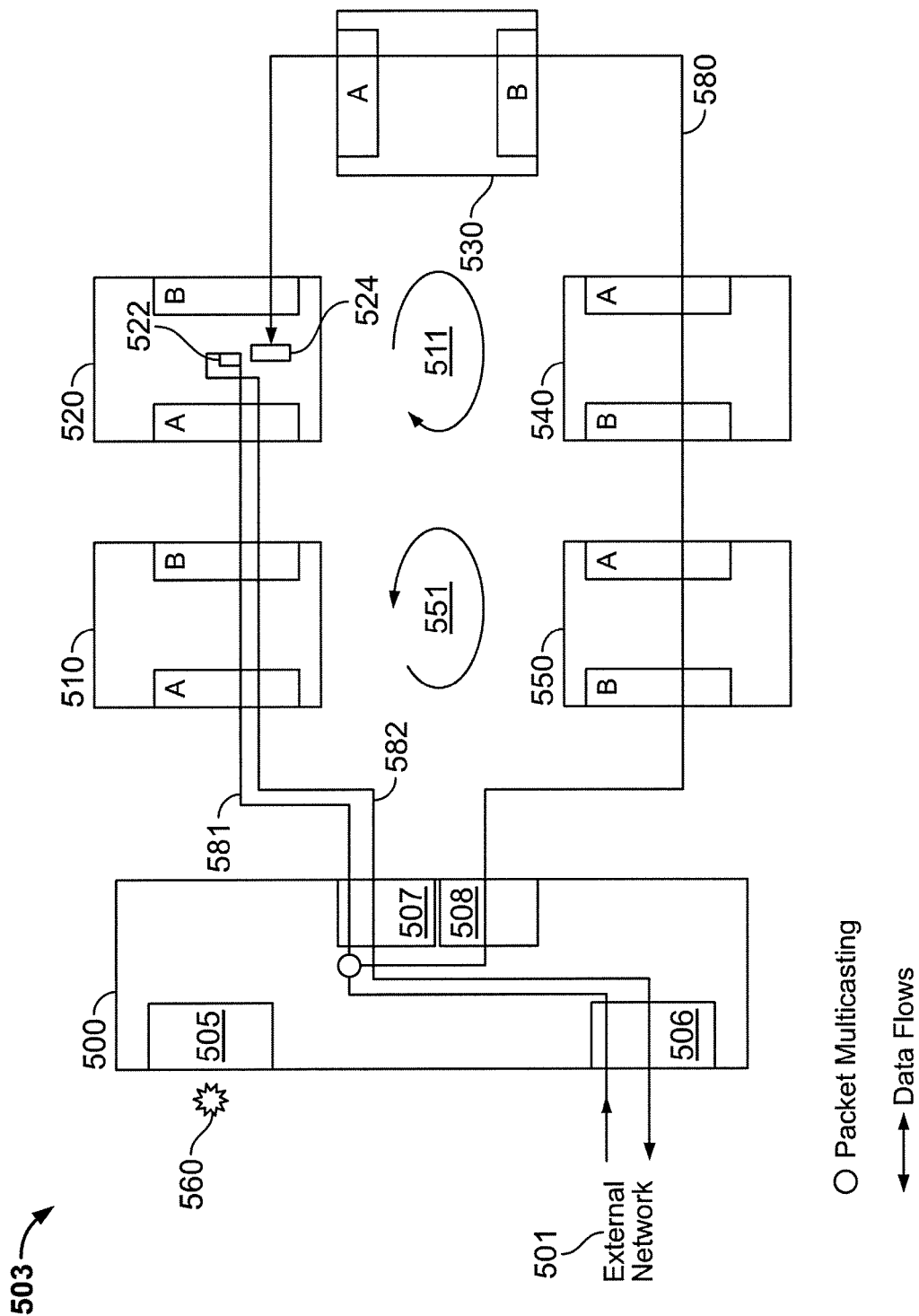
FIGS. 5B through 5G depict data flows during failure conditions on an exemplary ring network, according to an embodiment of the present invention.
Figure 5C:
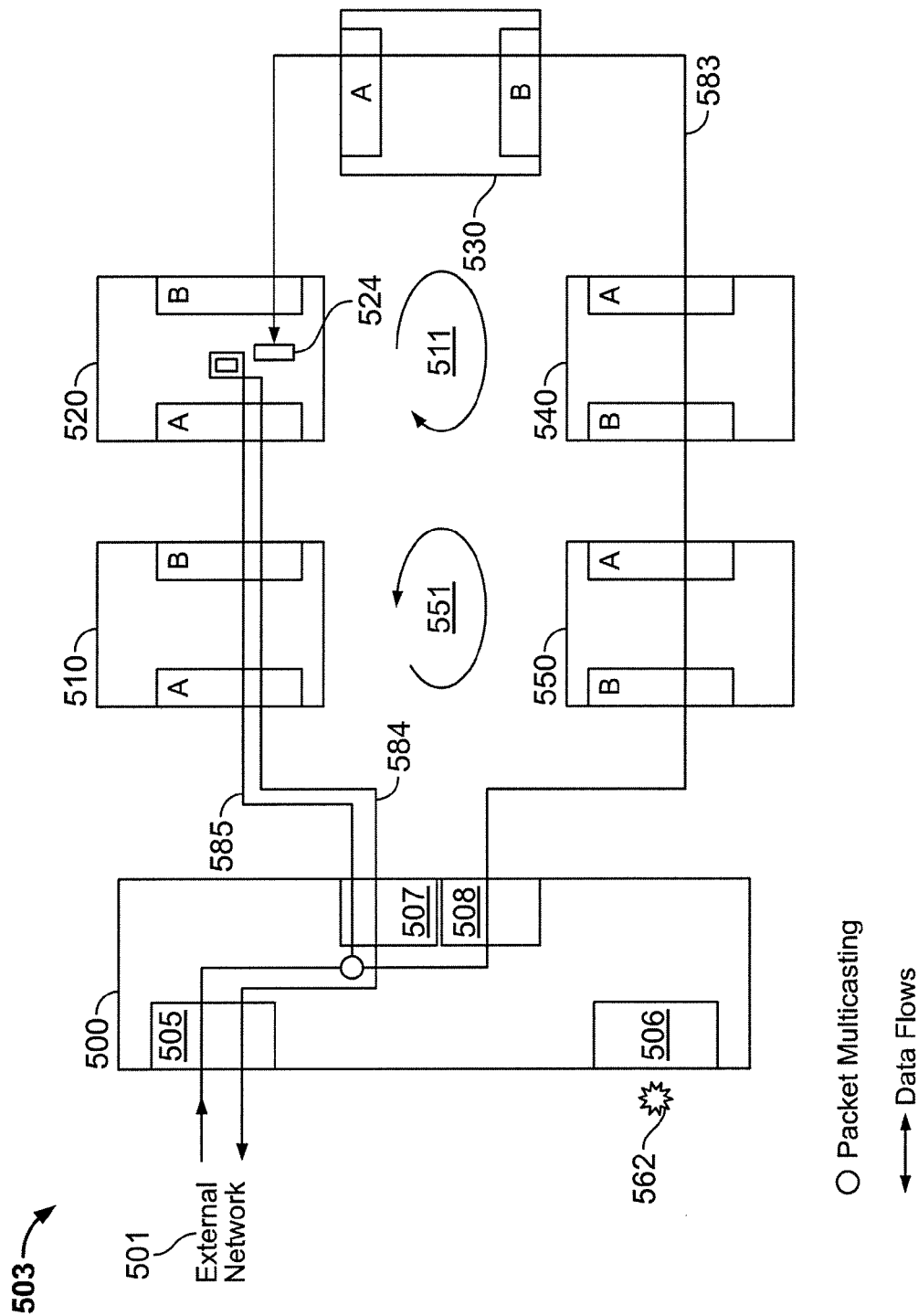

FIGS. 5B and 5C depict exemplary data flows during auto-recovery of failure conditions 560 and 562 on either port 505 or port 506 to the external network 501.

A failure on either the link to port 505 or port 506, but not both, will not cause different data flows within the network loop 503. Instead, these failure conditions (560 and 562) will only make a difference on the data flows within the edge switch 500.

In FIG. 5B, data path via port 505 is blocked while the path via post 506 is still available. A packet is being sent from a remote host to node 520. According to an embodiment of the invention, two copies of the same received packet will be delivered to node 520. As shown in the FIG. 5B, the packet arriving from path 511 will be processed while an associated response message packet will be created and sent back to port 507 on edge switch 500 along path 511 but in the opposite direction. After the response packet arrives at port 507, edge switch 500 will forward the packet to port 506 and then the message is sent out of the loop network 503 to the external network 501 or to the remote host. As a result, a duplex communication channel between node 520 and the remote host can survive the failure 560. This recovery is ensured by the data flow control and the embodiments described in FIG. 3A and FIG. 3B.

In FIG. 5C, data path via port 506 is blocked while the path via post 505 is still available. According to embodiments of the invention under failure condition 562, it is also assumed that the packet is sent to node 520 from a remote host. For the scenario depicted in FIG. 5C, the data flows under failure conditions are similar to those described above with respect to the failure condition depicted in FIG. 5B.

Figure 5D:
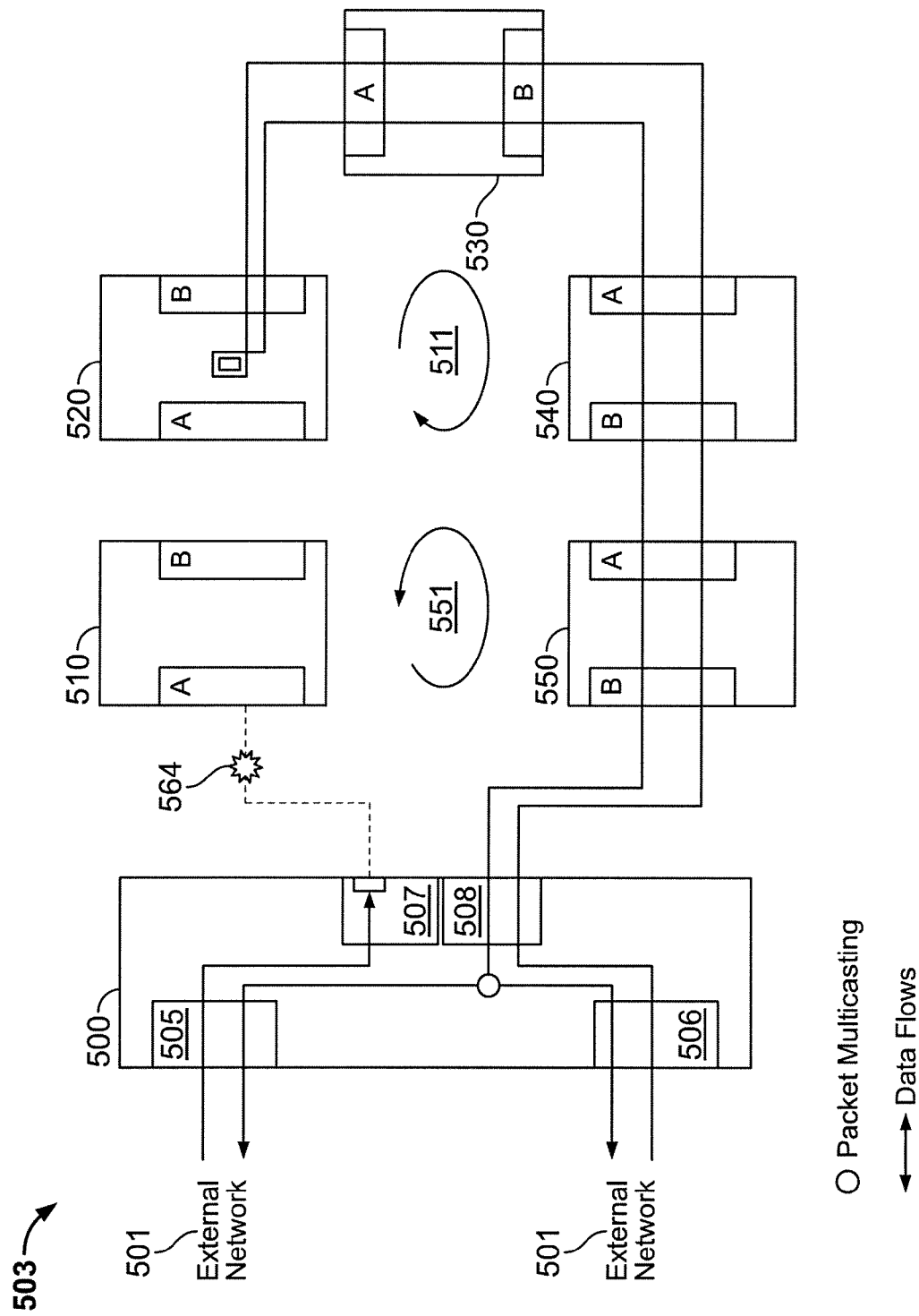

FIG. 5D depicts exemplary data flows during auto-recovery of failure condition 564 on the link between the edge switch 500 and node 510. In FIG. 5D, a packet is being sent from a remote host to node 520. Before failure 564 occurs, the packet destined for node 520 is sent from both ports 507 and 508 on node 500, i.e., two copies of the same packet will arrive at node 520, while the packet received on port A along path 511 will be the copy to be handled, and a response message packet will be sent back along the same path (data path 511) but in the opposite direction. These data flows have been shown in both FIGS. 4A and 4B.

After the failure 564 occurs (refer to FIG. 5D), only the packet along path 551 can reach node 520 while the second copy sent along path 511 can not. After node 520 receives the packet, it can process it and then send an associated response packet back to port 508 on edge switch 500 along the same path, i.e. path 551, but in the opposite direction via internal node 540 and node 550. On edge switch 500, when port 508 receives the response packet, the packet will be multicast to both ports 505 and 506 and then delivered to network 501. This recovery is ensured by the data flow control and the embodiments described in FIG. 3A and FIG. 3B.

Figure 5E:
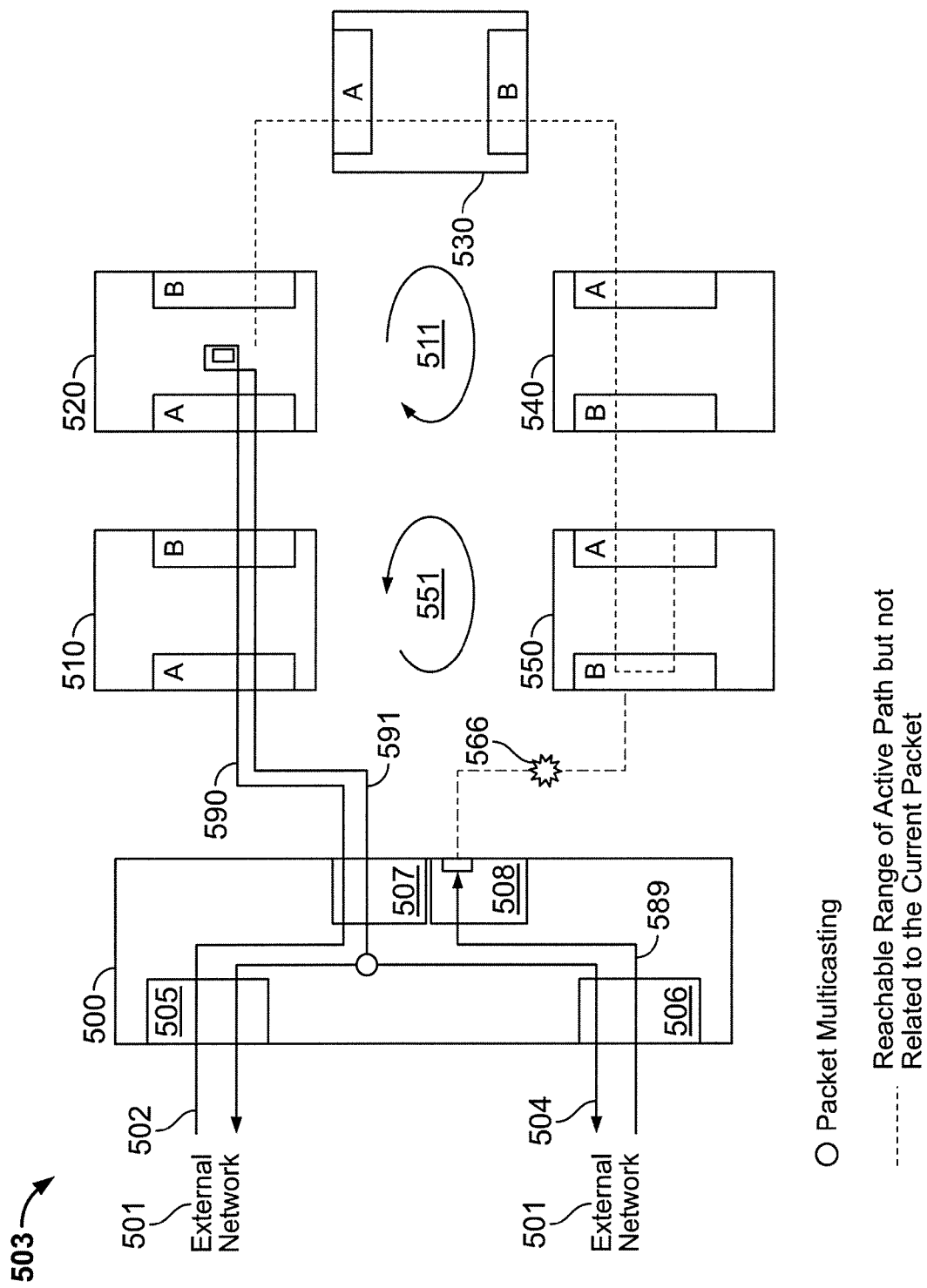

FIG. 5E depicts exemplary data flows during auto-recovery of failure condition 566 on the link between the edge switch 500 and node 550. In FIG. 5E, a packet is being sent from a remote host to node 520. The data flows for the scenario described in FIG. 5E, and according to the auto-recovery techniques described herein, are similar to those described under failure condition 564 in FIG. 5D.

Figure 5F:
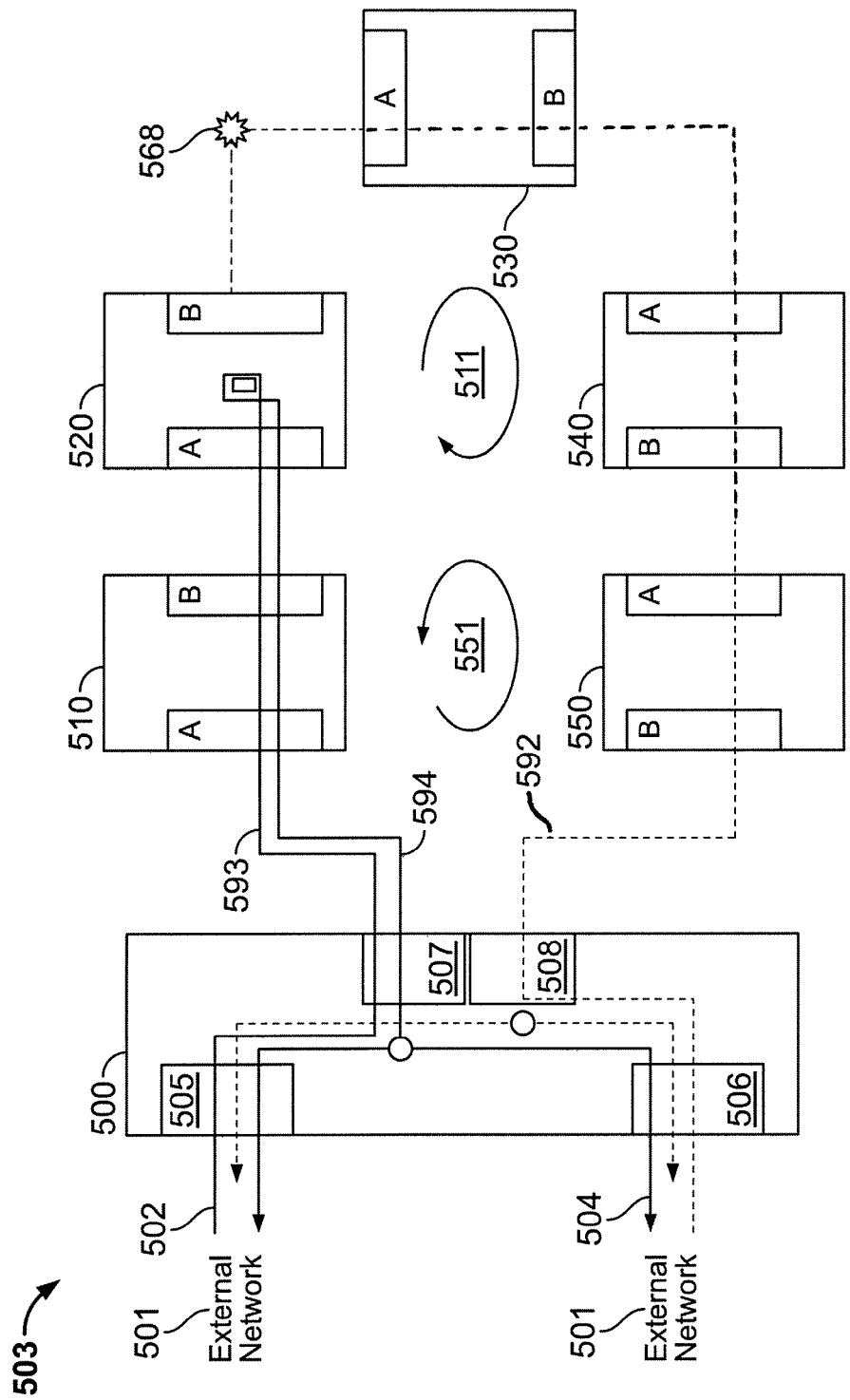

FIG. 5F depicts exemplary data flows during auto-recovery of failure condition 568 in the middle of the loop network 503. In FIG. 5F, a packet is being sent from a remote host to node 520. In the failure condition depicted in FIG. 5F, both paths 511 and 551 are broken at a point between node 520 and node 530. However, the part of path 511 from port 507 on edge switch 500 to node 520 and the part of path 551 from port 508 on edge switch 500 to node 530 are still connected. Thus, under the failure condition depicted in FIG. 5F, the remote host can still reach node 510 and node 520 via path 511, and can reach node 530, node 540 and node 550 via path 551. Under failure condition 568 according to embodiments of the present invention, if a remote host needs to send a packet to node 520, the only available data path will be path 511. However, a packet destined for 530 can only be delivered via path 551. This recovery is ensured by the data flow control and the embodiments described in FIG. 3A and FIG. 3B.

Figure 5G:
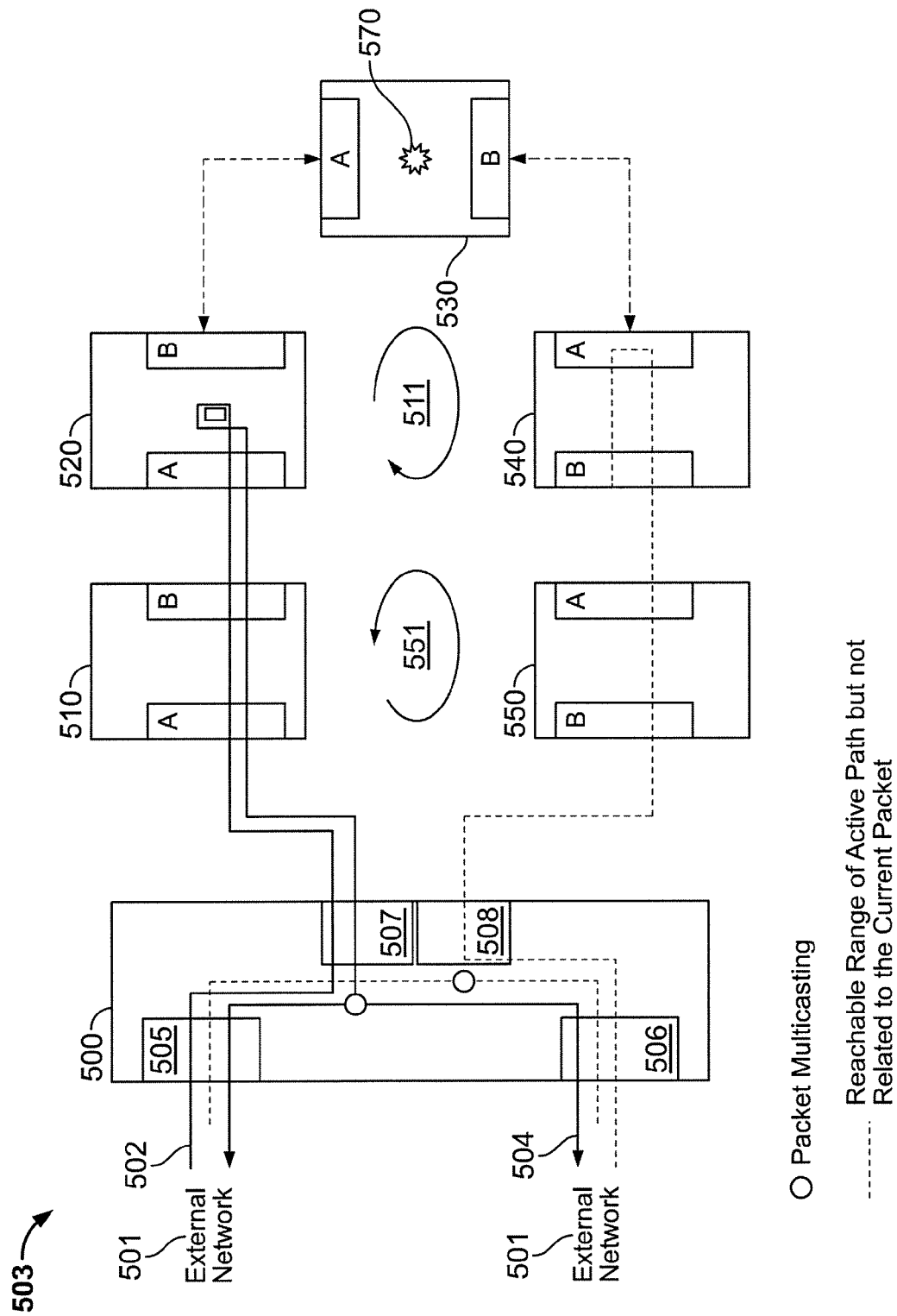

FIG. 5G depicts exemplary data flows during auto-recovery of failure condition 570 on a node in the middle of the loop network 503, in this embodiment, node 530. In FIG. 5G, a packet is being sent from a remote host to node 520. The failure condition 570 shown in FIG. 5G happens when a node on the loop 503 encounters an equipment failure or is removed. Under the failure condition, both ports on node 530 can not be used to communicate to neighbor nodes (or the edge switch if the faulty node happens to be the head node on path 551 or path 511). As shown in FIG. 5G, a remote host may only be able to access node 510 and node 520 via path 511, and a remote host may only be able to access node 540 and node 550 via path 551. Node 530, in the embodiment of FIG. 5G, cannot be accessed via either path. Similar to other failure scenarios described above, the communication channel between the remote host and the target node 520 on the network loop 503 survives this failure. In addition, according to the embodiment of FIG. 5G, a response message sent by node 520 to the remote host may be delivered to the host on both links 502 and 504 via port 507 on the edge switch node 500. This recovery is ensured by the data flow control and the embodiments described in FIG. 3A and FIG. 3B.

When an equipment failure occurs on the edge switch 500, or if edge switch 500 is unplugged from the network (i.e., failure condition 572 in FIG. 5A), there is no way to recover communications between a remote host the nodes in the loop network 503 according to embodiments of the present invention.

In accordance with embodiments of the invention described above with respect to an edge switch 500 configured with 4 ports, as shown in FIG. 5A, both links to external network 501 carry the same traffic in both ingress and egress directions. In addition, with respect to an edge switch 500 that is configured with either 3 ports or 4 ports, the traffic along the two data paths within the network loop 503 (paths 511 and 551) are the same. As a direct result, according to aspects of the present invention, two copies of the same data packet may be delivered to the target node under normal operation. Under the failure conditions described herein and according to aspects of the invention, a target node should receive at least one copy of the data packet due to the redundancy.

Persons of ordinary skill in the art will recognize that the foregoing techniques may be implemented on a variety of ringed or loop networking systems and with a variety of transmission media. Networks based on wire, fiber optic cable, wireless or other transmission media may utilize the present invention. For instance, another embodiment of the present invention includes the implementation of the foregoing auto-recovery techniques in a satellite-based network. In such an implementation, a node in a satellite network might receive duplicate transmissions from two satellite stations. According to aspects of the invention, the node would process the duplicate transmissions as described above.

It should be further noted that certain aspects of the present invention have been described herein, but the invention is not limited to the embodiments described. Those skilled in the art will recognize additional variations embodied by the present invention upon reading or upon practice of the invention. The following claims demonstrate the breadth of the invention.

We claim:

1. A method of implementing fault recovery in a network node, wherein the network node is a node in a ring topology network, comprising the steps of:
   (a) receiving a data packet on an ingress path of a first port of the network node;
   (b) determining whether a copy of the packet has already been received on an ingress path of a second port of the network node;
   (c) determining whether the packet is addressed to the network node; and
   (d) processing the packet, such that:
      (A) when the packet is not addressed to the network node, forwarding the packet to a neighboring network node; and
      (B) when the packet is addressed to the network node, building a response packet and forwarding the response packet to a neighboring network node.

2. The method of claim 1, wherein the ring topology network is part of an industrial automation system.

3. The method of claim 2, wherein the network node is an Input/Output (I/O) module in the industrial automation system.

4. The method of claim 1, wherein step (d)(A) further comprises forwarding the packet to a neighboring network node via an egress port of the second port of the network node.

5. The method of claim 1, wherein step (d)(B) further comprises forwarding the response packet to a neighboring network node via an egress port of the first port of the network node.

6. The method of claim 1, wherein step (b) comprises:
   (A) receiving transaction information and a timestamp for the packet received on the first port of the network node;
   (B) comparing the transaction information and the timestamp for the packet received on the first port of the network node to transaction information and a timestamp for a most recent packet received on the second port of the network node to determine if the packets match.

7. The method of claim 6, wherein the transaction information and the timestamp for the packet received on the first port of the network node are stored in a data structure.

8. The method of claim 6, wherein the transaction information and the timestamp for the most recent packet received on the second port of the network node are stored in a data structure.

9. The method of claim 7, wherein the data structure is a first in first out (FIFO) Queue.

10. The method of claim 7, wherein the data structure is a linked list.

11. An I/O module in a distributed industrial automation system, wherein the I/O module is a module in a ring topology network, including:
   a processor;
   a memory coupled to the processor and wherein the memory contains computer-executable instructions to perform the steps of:
      (a) receiving a data packet on an ingress path of a first port of the I/O module;
      (b) determining whether a copy of the packet has already been received on an ingress path of a second port of the I/O module;
      (c) determining whether the packet is addressed to the I/O module; and
      (d) processing the packet, such that:
         (A) when the packet is not addressed to the I/O module, forwarding the packet to a neighboring module on the ring topology network; and
         (B) when the packet is addressed to the I/O module, building a response packet and forwarding the response packet to a neighboring module on the ring topology network.

12. The I/O module of claim 11, wherein step (d)(A) further comprises forwarding the packet to a neighboring module via an egress port of the second port of the I/O module.

13. The I/O module of claim 11, wherein step (d)(B) further comprises forwarding the response packet to a neighboring module via an egress port of the first port of the I/O module.

14. The I/O module of claim 11, wherein step (b) comprises:
   (A) receiving transaction information and a timestamp for the packet received on the first port of the I/O module;
   (B) comparing the transaction information and the timestamp for the packet received on the first port of the I/O module to transaction information and a timestamp for a most recent packet received on the second port of the I/O module to determine if the packets match.

15. The I/O module of claim 14, wherein the transaction information and the timestamp for the packet received on the first port of the I/O module are stored in a data structure.

16. The I/O module of claim 14, wherein the transaction information and the timestamp for the most recent packet received on the second port of the I/O module are stored in a data structure.

17. The I/O module of claim 15, wherein the data structure is a FIFO Queue.

18. The I/O module of claim 15, wherein the data structure is a linked list.

19. A tangible non-transitory computer-readable medium containing computer-executable instructions for causing a computer device on a ring topology network to perform the steps comprising:
 (a) receiving a data packet on an ingress path of a first port of the computer device;
 (b) determining whether a copy of the packet has already been received on an ingress path of a second port of the computer device;
 (c) determining whether the packet is addressed to the computer device; and (d) processing the packet, such that:
  (A) when the packet is not addressed to the computer device, forwarding the packet to a neighboring computer device; and
  (B) when the packet is addressed to the computer device, building a response packet and forwarding the response packet to a neighboring computer device.

20. The tangible computer-readable medium of claim 19, wherein the computer device is part of an industrial automation system.

21. The tangible computer-readable medium of claim 19, wherein step (d)(A) further comprises forwarding the packet to a neighboring computer device via an egress port of the second port of the computer device.

22. The tangible computer-readable medium of claim 19, wherein step (d)(B) further comprises forwarding the response packet to a neighboring computer device via an egress port of the first port of the computer device.

23. The tangible computer-readable medium of claim 19, wherein step (b) comprises:
 (A) receiving transaction information and a timestamp for the packet received on the first port of the computer device;
 (B) comparing the transaction information and the timestamp for the packet received on the first port of the computer device to transaction information and a timestamp for a most recent packet received on the second port of the computer device to determine if the packets match.

* * * * *